UNITED STATES PATENT OFFICE.

WILLIAM PAINTER, OF BALTIMORE, MARYLAND, ASSIGNOR TO THE CROWN CORK AND SEAL CO., OF BALTIMORE, MARYLAND.

GLUTEN COMPOUND.

SPECIFICATION forming part of Letters Patent No. 684,523, dated October 15, 1901.

Application filed February 20, 1899. Renewed March 21, 1901. Serial No. 52,247. (No specimens.)

*To all whom it may concern:*

Be it known that I, WILLIAM PAINTER, a citizen of the United States, residing at Baltimore, Maryland, have invented certain new and useful Improvements in Gluten Compounds, of which the following is a specification.

In an application filed by me January 14, 1898, under Serial No. 666,664, I have described a compound consisting of gluten, glycerin, and a body material and a process of preparing said compound. In the application of this compound to certain of the purposes for which it is designed I have found that where long-continued contact with watery liquids is had the great affinity of glycerin for water results to some extent in its being dissolved out of the compound. In an application filed by me on the 3d of October, 1898, Serial No. 692,538, I have described a process designed to counteract this tendency of the glycerin to dissolve out of the compound; but I have also discovered that in some cases or for some purposes the glycerin may be omitted, and instead of it an insoluble non-drying softening agent may be used. To this end I mix together the gluten and body material, and then under gentle heat add a melted compound of some suitable resinous or pitchy and an oily, fatty, or waxy substance, the proportions of which will largely determine the final hardness of the product, which will also be insoluble in watery liquids. For some purposes it is indispensable that the compound shall contain no ingredient having any perceptible odor or flavor, so that it may not impart such odor or flavor to liquids with which it may come in contact. In such cases I prefer to use for the resinous ingredient the inert neutral resin manufactured from ordinary rosin, known in the arts as "ester-gum," and for the oleaginous or waxy material vaseline, paraffin, mineral wax, or stearic acid may be used, all of which are practically tasteless and odorless. When odor or flavor is of no consequence, I may use for the resinous or pitchy material ordinary rosin, pitch, or asphaltum.

As I have stated above, I have found that for many purposes the addition of the resinous or pitchy and fatty or waxy materials imparts sufficient final softness to the compound, and in such cases I omit glycerin. As an example of the compound, I take three pounds of granulated or pulverized cork and incorporate therewith five pounds of gluten in the plastic state, adding three pounds of ester-gum with one pound of vaseline, melted together, making the final mixture under a gentle heat. After incorporating I roll or mold the product into the desired form and subject the whole to heat at about 200° to 250° Fahrenheit for several hours. Upon removal from the oven when cold it is ready for use.

What I claim is—

1. A compound consisting of gluten, a body material and a non-drying insoluble softening material.

2. A compound consisting of gluten, a body material and a non-drying insoluble softening material comprising a mixture of resinous and fatty matter, substantially as described.

In testimony whereof I affix my signature in presence of two witnesses.

WILLIAM PAINTER.

Witnesses:
JOHN T. HAWKINS,
W. H. WHEELER.